March 28, 1939.　　G. RABUTEAU ET AL　　2,151,937
GAS-TIGHT JOINT
Filed Oct. 16, 1936　　3 Sheets-Sheet 1
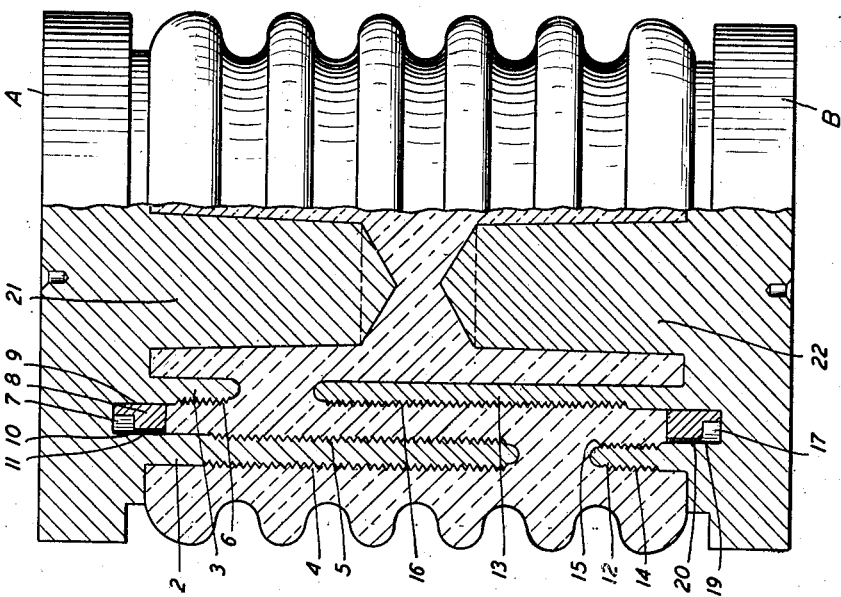
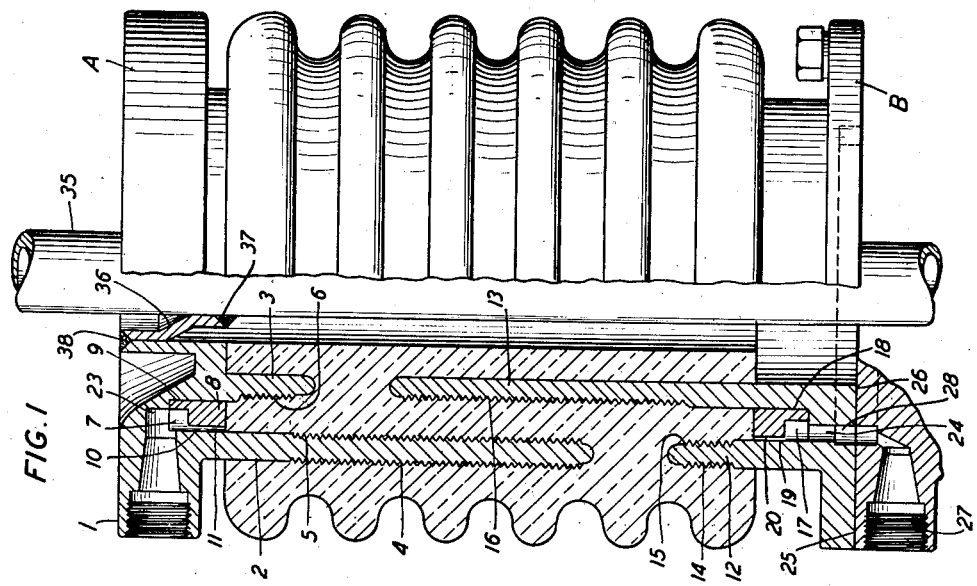
INVENTORS: G. RABUTEAU
G. P. CHEVIGNY
BY　Ed Phinney
ATTORNEY March 28, 1939.   G. RABUTEAU ET AL   2,151,937
GAS-TIGHT JOINT
Filed Oct. 16, 1936   3 Sheets-Sheet 2

INVENTORS: G. RABUTEAU
G. P. CHEVIGNY
BY
ATTORNEY

March 28, 1939.  G. RABUTEAU ET AL  2,151,937
GAS-TIGHT JOINT
Filed Oct. 16, 1936  3 Sheets-Sheet 3

INVENTORS: G. RABUTEAU
G. P. CHEVIGNY
BY E. D. Phinney
ATTORNEY

Patented Mar. 28, 1939

2,151,937

UNITED STATES PATENT OFFICE 2,151,937

GAS-TIGHT JOINT

Guy Rabuteau and Georges Paul Chevigny, Paris, France, assignors to International Standard Electric Corporation, New York, N. Y.

Application October 16, 1936, Serial No. 105,893
In France January 17, 1936

11 Claims. (Cl. 250—27.5)

This invention relates to improvements in gastight joints, particularly to joints adapted for the introduction of connections of currents inside electric discharge tubes.

The invention also relates to methods of construction of such joints by means of insulating materials such as vitreous materials or enamels.

The invention will be better understood by means of the following description of some embodiments shown in the attached drawings, in which Fig. 1 shows an improved form of joint between two metal members A and B;

Fig. 2 represents a structure which may be modified to form a joint such as shown in Fig. 1;

Figure 3:
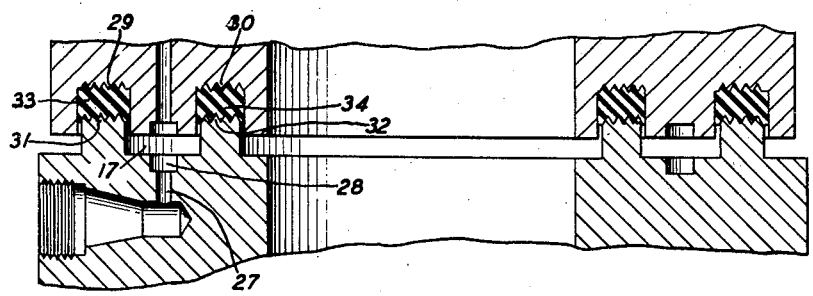
Fig. 3 represents a detail of a joint employing plastic material in order to ensure the mounting of the joint on an electric discharge tube.

One of the disadvantages in effecting such joints is that the introduction of air may be produced along the metal members or even through the insulating material.

The shape of the members to be joined is such that air or gas proceeding from fissures or porosities in the insulating material of the joint and tending to travel into the discharge tube with which the joint is connected, may be directed towards the metallic surfaces so that the air or gases end by arriving along the metallic surfaces themselves. In order to collect this air or gas one or more collecting chambers are provided.

Fig. 1 represents a joint between two members A and B, for example of metal. Through the upper portion of the member A passes a tube 35 joined in a tight manner, for example, by soldering at 37 to an intermediate ring 36 on the tube 35 and to the member A at 38. This member 35 may serve for example for conveying current to the interior of the electric discharge tube.

The member A comprises a base 1 and cylindrical portions 2 and 3 grooved at 4, 5 and 6. Between the cylindrical portions 2 and 3 towards the base 1 is arranged a cylindrical chamber 7 comprised between this base and a metal ring 8 forcibly sunk in the cylindrical groove 9. A cylindrical space or groove 10 is arranged between this ring 8 and the side 11 of the cylindrical portion 2.

The dimensioning of the space 10 will be explained later in detail.

The member B comprises a device similar to the member A; it comprises two cylindrical portions 12 and 13 grooved at 14, 15, 16. A cylindrical chamber 17 is provided and is comprised between the ring 18 and the cylindrical groove 19, a space also existing between the ring 18 and the surface 20 of the cylindrical portion 12. These members A and B are insulated from each other by means of an insulating material such as vitreous materials or enamels or by other insulating material permitting of moulding, e. g. Insolantite, porcelain or Bakelite, such material ensuring moreover a tight joint between the members A and B and giving to the whole the requisite mechanical solidity.

The part B may be connected to a discharge tube, the entire arrangement serving as an insulating seal for permitting the entrance of the lead-in conductor 35 into the tube attached to B. The seal may obviously be used for other purposes, likewise. The tube or other part may be secured to B by bolting to the flange of B or by welding or any other known method.

The unit of members A and B can, for example, be obtained by moulding, the shape before moulding given to the members A and B being shown in Fig. 2. The members A and B comprise central cylindrical portions 21 and 22 which are reamed or drilled after moulding, a hole being pierced in order to obtain a member arranged as shown in Fig. 1.

One of the difficulties met in making these members is due to the introduction of air or parasitic gas through either fissures or porosities in the insulating material, that is along the metallic members A and B, in consequence of poor adherence at least locally of insulating material on these members.

In order to avoid these disadvantages, the metallic members A and B have the surface of their cylindrical extensions 4, 5, 6, 14, 15, 16 grooved as previously explained. The shape of these grooves is such that it increases the length of the line of escape while permitting easy entry of the insulating material to the bottom of these grooves. All the known methods for increasing the length of the lines of escape and for permitting good entry of the insulating material at the time of moulding can consequently be employed.

The form of the cylindrical extensions is, moreover, such that the majority of the fissures adapted to be produced inside the insulating material terminate on these cylindrical extensions 2 and 12.

One of the features of the invention is to provide at the bottom of the cylindrical grooves 10 and 19, chambers 7 and 17 in which the insulating material cannot be introduced at the time of moulding, the dimension of the grooves 10 and 19 by which these chambers are in communication with the insulating material being sufficiently small to prevent the passage of this material at the time of moulding. The lines of escape of air passing along the cylindrical surfaces 4 and 14 are consequently obliged to pass through the cylindrical chambers arranged at 7 and 17, these chambers being consequently adapted to be employed as escape collecting chambers and connected by means of holes (23 with regard to the chamber 7, and 24 with regard to the chamber 17), towards a pump maintaining in these chambers a sufficient vacuum which may be of the same order as that which it is desired to maintain inside the electric discharge tube. The difference of pressure existing between these points and the inner portion of the electric discharge tube is very slight and practically prevents any entry of air through the porosities in the insulating material adjacent to the inside of the electric discharge tube or along the cylindrical portions 13 and 3.

These cylindrical portions moreover are themselves grooved at 6 and 16 so as also to increase the length of the path through which any air must pass and reduce the amount of leakage to the minimum.

It has been indicated that the intermediate vacuum connection on the escape collector or chamber 17 was made through a hole 24. This hole, for example, may end in a cylindrical groove 28 arranged on the surface of the electric discharge tube on which the portion B has just been fixed. A tight joint is effected between the portions 25 and 26 and a suitable pump is connected at 27 to a circular groove 29. The tight joints between 25 and 26 can be carried out in accordance with one of the known manners, either by levelling the corresponding surfaces in a perfectly plane manner and by resting these surfaces on each other, but providing between them a substance such as oil or any other product ensuring the maintenance of the tightness. The joints between portions 25 and 26 can also be carried out as indicated in Fig. 3, by giving these surfaces 25 and 26 the shape of grooved recesses such as 29 and 30, the corresponding portion of the electric discharge tube having on the other hand grooved cylindrical portions also at 31 and 32.

Joints of rubber or other plastic materials 33 and 34 placed between these portions 29 and 31, and 30 and 32, ensure by pressing a suitable tightness. The connection of the pump ensuring the vacuum in the chambers 17 is made as previously, through a hole 27 and a groove 28.

Figure 4:
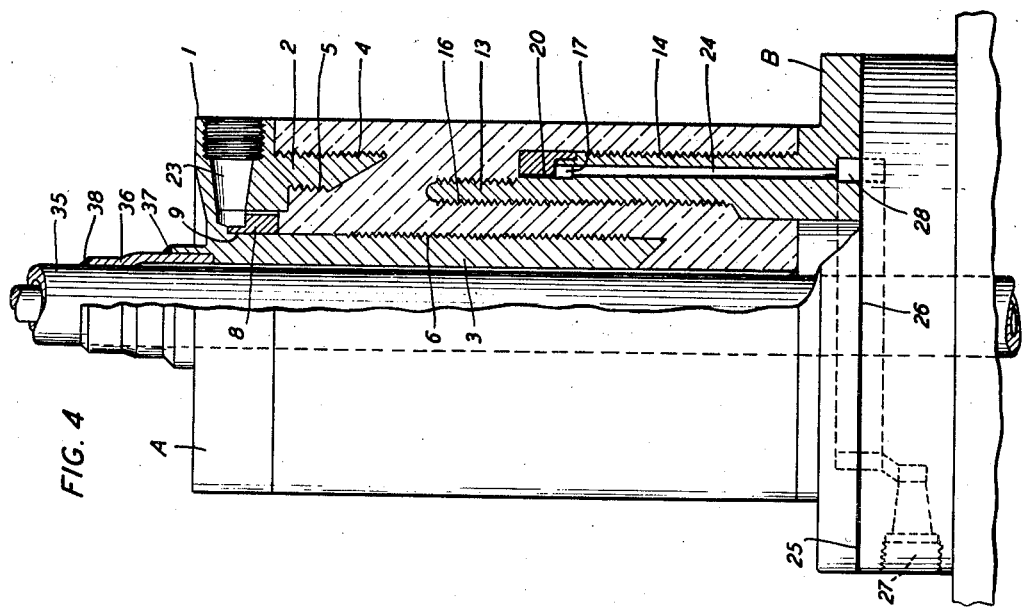
Fig. 4 represents a different form of the joint shown in Fig. 1.

Another embodiment of the member is shown on Fig. 4. The arrangement of the metal portions has the same object as that provided for Fig. 1. In Fig. 4 the members similar to those of Fig. 1 are designated by the same reference numerals.

Figure 5A:
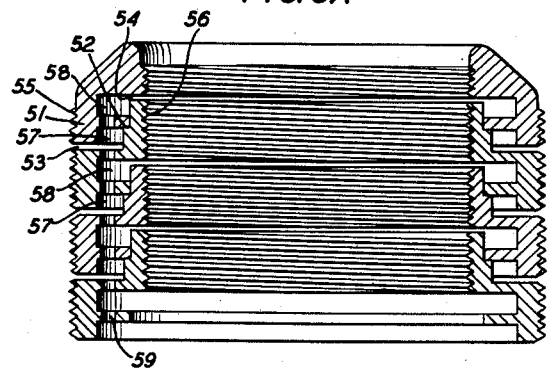
Figs. 5, 5a and 6 represent other embodiments in which each element to be joined is composed of a series of superposed members.
Figure 5:
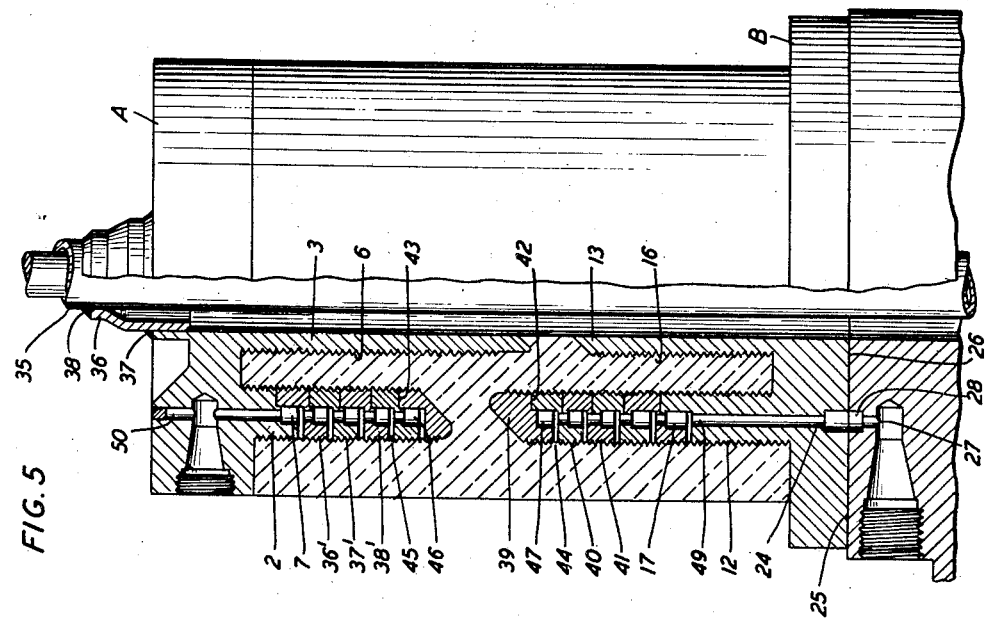

Another improved arrangement of the above devices is shown in Fig. 5. In the drawings, the metal parts A and B instead of comprising two cylindrical portions 2 and 12 and a single escape collecting chamber 7 and 17, comprise the superposition of rings such as 36', 37', 38', 39, 40, 41 whose dimensions and number may vary within wide limits. These rings placed on each other and in contact at their adjacent surfaces such as 42 and 43 leave at 44 and 45 a sufficiently narrow passage to prevent any introduction of insulating material in the chambers such as 46 and 47. Holes 49 and 50 made through all these cylindrical rings after moulding permit these circular chambers to be joined to each other. As explained in the case of Fig. 1, the air or gas introduced through fissures or porosities finally travels as a rule along the surfaces of the metal portions 2 and 12 and of the cylindrical rings such as 39 and 38', the leakages thus make their path to crevices such as 44 and 45 through which they enter into chambers such as 46 and 47, whence they are sucked by a pump ensuring a suitable vacuum in these chambers.

The rings shown in Fig. 5 permit the leakage of air to be collected on the outer cylindrical surfaces, the joints between the parts corresponding to the other surfaces being relatively tight, these members being suitably pressed against each other.

The tightness of these joints may be ensured by coating the corresponding surfaces of the cylindrical rings with an enamel, which at the time of moulding ensures a tight joint between the parts in contact of these various rings.

Another arrangement shown in Fig. 5A illustrates on the other hand a form of ring such as 51 in which the joint between the rings is made at 52 and two spaces 53 and 54 are provided to permit the leakages on each surface 55 and 56 of the rings. The escape collecting chambers 57 and 58 are joined to each other by a hole 59 passing through a series of rings, which hole may be made after moulding.

Figure 6:
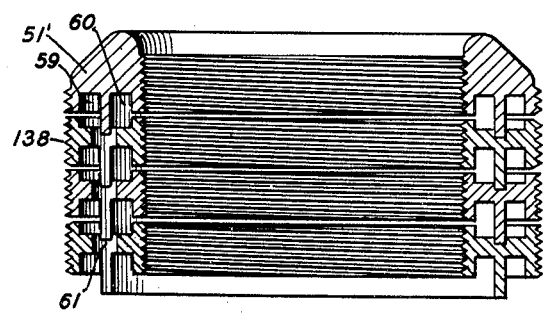

Another embodiment is shown in Fig. 6, the escape collecting chambers are shown at 59 and 60 and their joining is obtained by piercing a hole 61 which connects the whole of these chambers after moulding. The cylindrical rings such as 138 and 51' may have their surfaces grooved as previously explained for the portions such as 4 of member A, Fig. 1.

What is claimed is:

1. A gas-tight joint comprising a metallic ring member having concentric cylindrical extensions, a mass of insulating material moulded to said extensions, a chamber in said joint, an inlet communicating with said chamber for the passage of parasitic fluids entering said insulating material to be collected in said chamber, and an outlet in said ring member for evacuating said chamber.

2. A gas-tight joint comprising a metalic ring member having concentric cylindrical extensions, a mass of insulating material moulded to said extensions, a chamber intermediate said concentric extensions adjacent said ring member, an inlet for said chamber forming a restricted passageway between said insulating material and said chamber, and an outlet in said ring member communicating with said chamber.

3. A gas-tight joint comprising a pair of end ring members, a mass of insulating material between said ring members, each member having an annular metallic portion embedded in said mass, said annular member having rough surfaces engaging the moulded insulating mass, an outlet in each ring member, an internal cavity communicating with each outlet, and a restricted passageway into said cavity adjacent to said metallic portion.

4. A gas-tight joint comprising a pair of end ring members, a mass of insulating material between said ring members, each member having concentric integral extensions of different lengths, said extensions being embedded in said mass, a cavity intermediate said extensions, a restricted passageway for transferring to said cavity leakage fluids present along the surfaces between said extensions and mass, and means for evacuating said fluids from said cavity.

5. A gas-tight joint comprising a pair of end ring members having concentric integral extensions of different lengths, an intermediate mass of insulation moulded to said rings and extensions, the extensions on opposed ring members being arranged in alignment, the aligned extensions being of different lengths, a cavity intermediate each pair of extensions, a restricted passageway leading from each cavity toward said insulating mass, and an outlet extending from each ring member to the respective cavities for the evacuation of fluids from said cavities.

6. A gas-tight joint for a conductor of a discharge device comprising a pair of end ring members having concentric integral extensions, an intermediate mass of insulation moulded to said rings and said extensions, a cavity intermediate each pair of extensions, a restricted passageway between said cavity and said mass, an outlet opening extending from each cavity to the respective ring member, and a central conductor secured to one of said ring members.

7. A gas-tight joint for an electrode conductor of a discharge device comprising a pair of annular metallic end plates, an intermediate cylindrical mass of moulded insulating material, said plates having inner and outer metallic extensions, at least the outer coaxial extensions being embedded in said moulded insulating mass, a metallic insert located between each inner and outer extension for forming a restricted passageway and a fluid collecting cavity, an outlet communicating with said cavity and extending to each of said end plates, an electrode conductor extending through said end plates and said mass, and means connecting said conductor to one of said end plates.

8. A gas-tight joint comprising a pair of annular end plates having opposed concentric cylindrical extensions, a mass of insulating material moulded between said end plates and wholly embedding at least one extension of each end plate, the wholly embedded extension being formed of superimposed ring members, each ring member having a central cavity, an outlet extending from all the cavities through said respective end plates, and adjacent ring members forming restricted passageways leading into the respective cavities.

9. A gas-tight joint comprising a pair of annular metallic end members, a cylindrical moulded mass of insulating material intermediate said end members, a cylindrical extension on each of said end members having a surface in contact with said moulded mass of insulating material, a plurality of superimposed metallic rings embedded in said mass and joined to said end members, said rings having co-operating flanges and seats for forming collecting cavities therein and communicating restricted passageways between said cavities and the moulded mass, and said end members having outlet openings joining said cavities for the evacuation of parasitic fluid collected therein.

10. A gas-tight joint comprising a pair of annular metallic end members, a cylindrical moulded mass of insulating material intermediate said end members, a cylindrical extension on each of said end members having a surface in contact with said moulded mass, a plurality of superimposed metallic rings embedded in said mass and joined to said end members, said rings having co-operating cylindrical inner flanges and slots for forming collecting cavities therein and communicating restricted passageways between said cavities and the moulded mass, an outlet in each of said end members, and a connecting passageway from said cavities to said outlet in said end members.

11. A gas-tight joint comprising a pair of end ring members, a mass of insulating material between said ring members, each member having an annular metallic portion embedded in said mass, an outlet in each ring member, an internal cavity in each member for the collection of parasitic fluids permeating said insulating mass, and a restricted passageway interconnecting said cavity and said outlet.

GUY RABUTEAU.
GEORGES PAUL CHEVIGNY.